Aug. 10, 1965         A. B. BERESKIN         3,200,335
       APPARATUS FOR ENABLING THE $H_i$, $H_f$, $H_o$, AND $H_r$
                CHARACTERISTICS OF TRANSISTORS TO BE DERIVED
Filed Feb. 7, 1961                                  3 Sheets-Sheet 1

INVENTOR
ALEXANDER B. BERESKIN

BY *Hurwitz and Rose*

ATTORNEYS

Aug. 10, 1965     A. B. BERESKIN     3,200,335
APPARATUS FOR ENABLING THE $H_i$, $H_f$, $H_o$, AND $H_r$
CHARACTERISTICS OF TRANSISTORS TO BE DERIVED

Filed Feb. 7, 1961     3 Sheets-Sheet 2

INVENTOR
ALEXANDER B. BERESKIN

BY *Hurwitz and Rose*

ATTORNEYS

INVENTOR
ALEXANDER B. BERESKIN

ATTORNEYS

United States Patent Office 3,200,335
Patented Aug. 10, 1965

3,200,335
APPARATUS FOR ENABLING THE $H_i$, $H_f$, $H_o$, AND $H_r$ CHARACTERISTICS OF TRANSISTORS TO BE DERIVED
Alexander B. Bereskin, 452 Riddle Road, Cincinnati 20, Ohio
Filed Feb. 7, 1961, Ser. No. 87,676
12 Claims. (Cl. 324—158)

The present invention relates generally to devices for measuring transistor characteristics and more particularly to a device for measuring various operating characteristics of a transistor, such as hybrid and conductance parameters, noise figure, alpha and beta cut off frequencies, D.C. current gain, D.C. operating conditions, collector current with the input terminals either short or open circuited, which is operative for both NPN and PNP transistors, connected in both the common base and common emitter configurations.

Prior arrangements for measuring transistor characteristics have proven unsatisfactory because they fail to provide sufficient measurements for completely determining D.C., audio and RF component parameters. Systems previously employed also generally are capable of measuring transistor characteristics in only one circuit configuration.

Prior structures for effecting multiple transistor measurements are also disadvantageous since they are bulky, difficult to manipulate and handle, frequently expensive and usually require special oscillator circuits. In the past, virtually no attempt has been made to measure the very important "noise" voltage and "noise figure" of a transistor.

Accordingly, it is an object of the present invention to provide new and improved apparatus for testing a plurality of D.C., audio and radio frequency transistor characteristics.

It is an additional object of the present invention to provide new and improved transistor testing apparatus wherein the transistor under test may be connected either in the common base or common emitter circuit configurations and wherein it is not necessary to remove the transistor from its initial connections to make such different configuration measurements.

It is a further object of this invention to provide new and improved transistor testing apparatus requiring no external oscillator supply but which utilizes the A.C. power line in lieu thereof.

It is another object of the present invention to provide a new and improved transistor tester capable of measuring "noise" voltages generated by a transistor and the "noise figure" thereof.

It is still an additional object of this invention to provide a new and improved transistor measuring system having sufficiently great sensitivity for measuring the required A.C. parameters.

It is a still further object of this invention to provide a transistor tester for measuring audio frequency hybrid and conductance parameters, audio frequency noise figure, alpha and beta cut off frequencies, collector current with the input terminals both short and open circuited, D.C. current gain and operating conditions for both NPN and PNP transistors connected in both common base and emitter configurations.

Basically in determining transistor audio frequency parameters, the present invention employs a pair of standardized resistors having small resistance. One resistor is connected in the transistors collector or output circuit, the other is connected in the input circuit which may be coupled to either the base or emitter electrode. The voltages across these resistors are respectively indicative of the current flowing through the input and output circuits. The output resistor is designed so as to provide substantially an audio frequency short circuit between the collector and ground. The input circuit resistor is actually short circuited by a switching arrangement except when measurements are made across it. By measuring the A.C. voltages across these standardized resistors and the input and output terminals with respect to ground it is possible to completely determine the small signal hybrid and conductance parameters of the unit being tested. This is achieved with the aid of a switching circuit to connect the A.C. power line to either the transistor input or output terminal. A capacitor may be switched across the transistor input terminals, thus providing an A.C. short circuit therebetween.

D.C. measurements are accomplished by connecting a milliameter in series with the collector bias supply and by connecting a calibrated voltmeter between one side of a variable, current limiting, input resistor and ground. Provison is made to both open and short circuit the input terminal with respect to ground so that D.C. collector current measurements may be made under both conditions.

To change the circuit configuration in which the transistor is connected, a double pole, double throw reversing switch is employed to reverse the base and emitter connections. In order to test transistors of both NPN and PNP varieties another double pole, double throw reversing switch is connected between the collector electrode and the collector bias supply.

To measure the noise figure of the transistor being tested, a resistor and capacitor are connected in series between the input and ground terminals and the output voltage across a variable collector resistor is measured both with and without a signal being applied to the input terminal. The voltage gain in the first instance is measured. In the second instance, a low pass filter is connected to the output terminal of a low noise, highly accurate amplifier of predetermined gain. The input terminals are connected across the collector resistor and the output voltage of the filter is measured with an RMS vacuum tube voltmeter. These measurements enable one operating the device to accurately compute the noise voltage generated by the unit being tested. The amplifier utilized in obtaining noise measurements may also be switched into the circuit to more accurately determine the value of small voltages in connection with the other tests.

In order to determine radio frequency characteristics, such as alpha and beta cut-off frequencies, of the unit being tested, a variable frequency, R.F. signal source of amplitude equal to the audio source is switched to the transistor input terminal and its frequency is varied until the voltage across the collector resistance has decreased to 0.707 of the audio frequency voltage. Indications of the transistor alpha and beta cut-off frequencies are obtained when the tested unit is connected in the common base and emitter circuit configurations, respectively.

All of the aforementioned parameters and characteristics are determined with a single, relatively simple arrangement utilizing novel switching and circuit arrangements.

The above and still further objects, features and advantages of the present invention will become apparent upon consideration of the following detailed description of one specific embodiment thereof, especially when taken in conjunction with the accompanying drawings, wherein.

Figure 1:
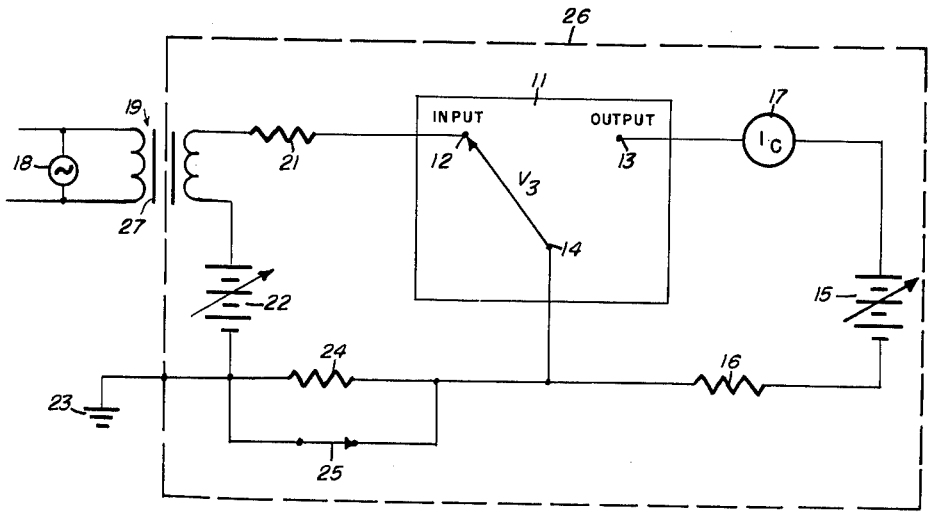
FIGURE 1 is an illustration of a schematic diagram of the connections according to a preferred form of this invention for measuring certain hybrid parameters.

Referring now to the drawings, and more particularly to FIGURE 1 thereof, disclosing apparatus for measuring transistor parameters with an A.C. short circuit across its output terminals, comprising a test block 11 containing input and output terminals 12 and 13, respectively, and another terminal 14. The transistor unit being tested is connected in the test block so that the collector electrode is always connected to output terminal 13 while either the base or emitter electrodes may be connected to either terminal 12 or 14. D.C. bias is supplied to output terminal 13 with respect to terminal 14 by way of variable battery 15 and a standardized resistor 16 series connected between terminals 13 and 14. In order to determine the D.C. current flowing through the collector electrode connected to terminal 13, a D.C. milliameter 17 is connected between battery 15 and terminal 13. The value of resistor 16 is small compared to the internal transistor resistance between terminals 13 and 14 so as to substantially provide an A.C. short circuit between terminals 13 and 14.

An A.C. signal source 18 obtained from a power line source, such as a 60 cycle outlet, is connected to input terminal 12 by way of transformer 19 and current limiting resistor 21. D.C. bias for input terminal 12 is provided by variable battery 22 connected between one end of the secondary winding of transformer 19 and the common or ground terminal 23. In order to determine the current flowing through the electrode connected to input terminal 12, resistor 24 is connected between ground terminal 23 and terminal 14 of the transistor test block 11. Switch 25 shunts resistor 24 at all times except when measurements are being made across it, at which time the switch is open and an indication of the A.C. voltage across resistor 24 is obtained with a suitable meter.

When this apparatus is utilized with an A.C. power line supply, a grounded shield is connected around the test apparatus and includes the secondary winding of transformer 19. In this manner, a power supply, such as a 60 cycle source, may be utilized for the signal source and stray pick-up voltages frequently prevalent with such supplies are minimized.

In utilizing this apparatus, the A.C. signal obtained across the secondary winding of transformer 19 is of small magnitude as compared to the value of biasing supply 22. The voltages developed across standardized, highly accurate resistors 16 and 24 are accurate indications of the A.C. current flowing through output terminal 13 and input terminal 12, respectively. The voltage across resistor 16 is measured only when switch 25 is closed and resistor 24 is short circuited. By shorting out resistor 24 in this manner accurate indications of A.C. collector current for grounded base or grounded emitter transistor configurations are obtained by measuring the A.C. voltage across resistor 16.

After having measured the voltages across resistors 16 and 24 with suitable A.C. measuring instruments, the hybrid parameters $h_i$ (input impedance with A.C. shorted output terminals) and $h_f$ (forward current transfer ratio with A.C. shorted output terminals) may be easily calculated from the following equations:

$$h_i = \frac{V_3}{\frac{V_{24}}{R_{24}}}$$

and $$h_f = \frac{\frac{V_{16}}{R_{16}}}{\frac{V_{24}}{R_{24}}}$$

where $V_3$ is the A.C. voltage between terminals 12 and 14, $V_{24}$ is the A.C. voltage across resistor 24, $R_{24}$ is the value of resistor 24, $V_{16}$ is the A.C. voltage across resistor 16, and $R_{16}$ is the value of resistor 16. In a preferred embodiment of the invention resistors $R_{24}$ and $R_{16}$ are substantially equal and have a value of 100.0 ohms in order to satisfy the previously stated requirements and to facilitate calculation of the various parameters.

Figure 2:
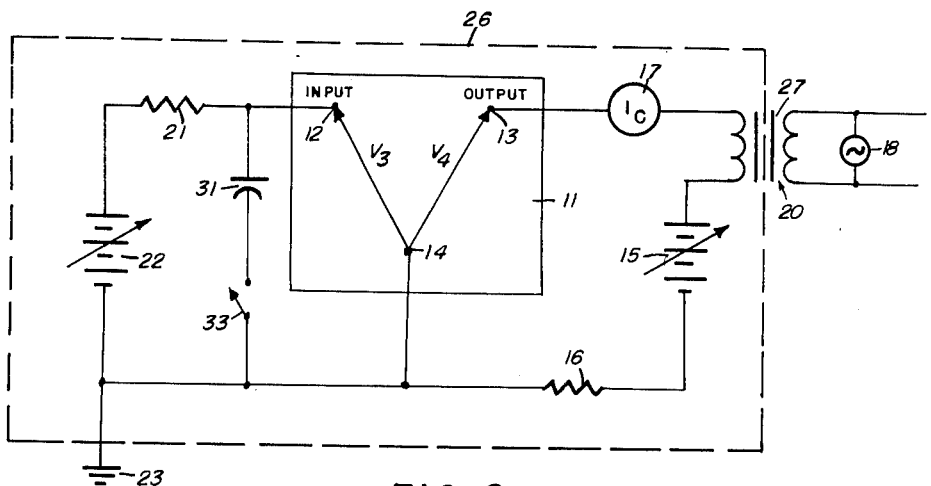
FIGURE 2 is an illustration of a similar schematic diagram for measuring certain hybrid and conductance parameters.

In order to measure the hybrid parameters $h_o$ (output admittance with an A.C. open circuit across the input terminals), $h_r$ (reverse transfer voltage ratio with an A.C. open circuit across the input terminals) and the conductance parameter $g_o$ (output conductance with an A.C. short circuit across the input terminals), the apparatus disclosed in the schematic diagram of FIGURE 2 is utilized. For measuring these quantities, the A.C. supply 18 is coupled to the output terminal 13 by way of transformer 20. A grounded shield is connected around the test apparatus and includes the secondary winding of transformer 20. Bias potential is applied between input terminals 12 and 14 by way of variable battery 22 series connected to current limiting resistor 21. Variable D.C. source 15 supplies collector bias to output terminal 13 by way of the secondary winding of transformer 20. In order to provide an A.C. short circuit between input terminal 12 and terminal 14, capacitor 31 is connected to terminal 12 and in series with one terminal of switch 33; the other switch terminal being connected to ground. Measurements with an A.C. short circuit across the input terminals of the tested transistor are accomplished when switch 33 is closed. Capacitor 31 is of sufficiently large magnitude as to short circuit terminals 12 and 14 together for any A.C. currents that flow from terminal 12 to terminal 14 as the result of A.C. signal source 18. When switch 33 is opened, resistor 21 is of sufficiently large magnitude to provide an effective open circuit between terminals 12 and 14 for the signals from source 18.

In order to obtain the hybrid and condutcance parameters for the transistor being tested, it is necessary for the A.C. voltages between terminals 12 and 14, $V_3$, and between terminals 14 and 13, $V_4$, to be measured as well as the voltage across standardized resistor 16. After these A.C. voltages have been measured the transistor parameters of interest may be computed as follows:

$$h_o = \frac{\frac{V_{16}}{R_{16}}}{V_4} \qquad h_r = \frac{V_3}{V_4}$$

and $$g_o = \frac{\frac{V_{16}}{R_{16}}}{V_4}$$

where all of the quantities are as previously defined in conjunction with FIGURE 1. In making these measurements, it is to be understood that the measurements for $h_o$ and $h_r$ are made with switch 33 open so as to provide an A.C. open circuit between terminals 12 and 14 and the measurement for $g_o$ is made with switch 33 closed so as to provide an A.C. short circuit between these terminals.

With the measurements obtained from the circuit configurations disclosed in FIGURES 1 and 2, a ready check may be obtained on the accuracy of the measurements made by computing the quantity $$g_o^* = h_o - \frac{h_f h_r}{h_i}$$

The computed value of $g_o^*$ may be compared with the measured value of $g_o$ to obtain an indication of the accuracy of the measured parameters.

Figure 3:
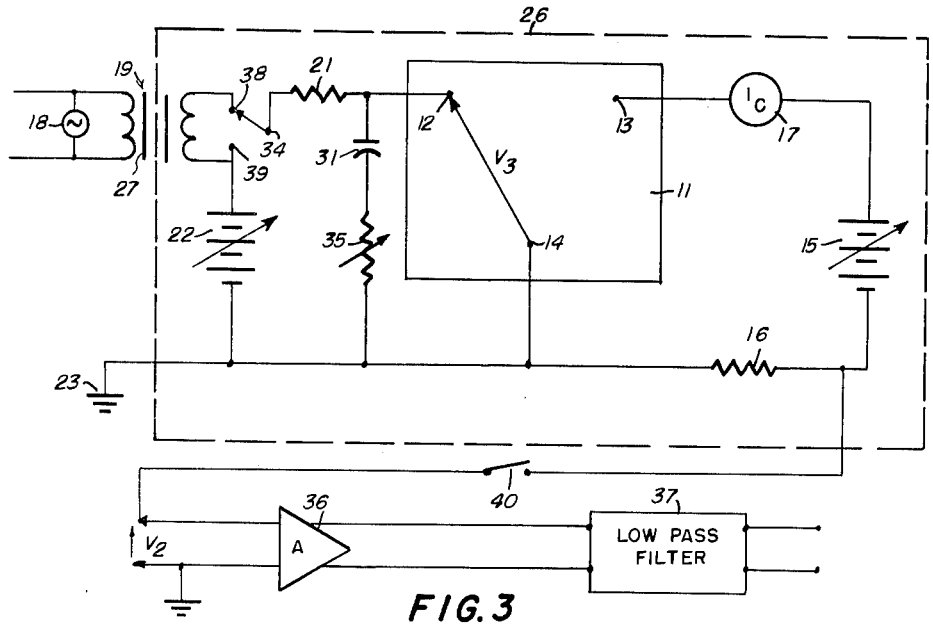
FIGURE 3 is a schematic diagram of the apparatus employed to measure transistor noise figure.

In order to measure the noise figure of the transistor being tested, the apparatus disclosed in FIGURE 3 is utilized. A.C. supply source 18 is coupled to input terminal 12 by way of transformer 19 and switch 34 connectable to either side of the transformer secondary winding. In making the noise measurement, the transistor under test is used as an amplifier and capacitor 31 and variable resistor 35 are series connected between terminals 12 and 14 to enable the transistor unit to function as an amplifying unit. In order to obtain sufficient amplifier gain, resistor 16 is made variable and may assume a plurality of different predetermined values depending upon the resistance of the standardized resistor switched into the circuit therefor. The voltage across resistor 16 is supplied to low noise amplifier 36 having accurate predetermined gain by closing switch 40. The output voltage of amplifier 36 is fed to a low pass filter having a predetermined cut-off frequency; in the preferred construction of the device the cut-off frequency is 15.5 kilocycles.

In measuring the noise figure of the transistor under test, switch 34 is placed on contact 38 so that the voltage induced in the secondary winding of transformer 19 by signal source 18 is coupled to the input terminal 12. The gain of the transistor being tested is then determined by measuring the A.C. voltage across resistor 16 and the A.C. voltage between terminals 12 and 14 by dividing the former by the latter. Noise voltage is measured by disconnecting the A.C. signal applied to input terminal 12 by shifting the position of switch 34 so that it alights on contact 39. Switch 40 is closed so that the noise voltage generated across resistor 16 is amplified by amplifier 36 and passed through low pass filter 37. The output voltage of filter 37 is measured with an R.M.S. vacuum tube voltmeter connected across its output terminals.

The equivalent noise voltage at the input terminals of the transistor may then be calculated as $$\frac{V_{R.M.S.}}{K_{36} \cdot K_T}$$

where $V_{R.M.S.}$ is the R.M.S. voltage measured by the vacuum tube voltmeter connected across the output terminals of filter 37; $K_{36}$ is the gain of amplifier 36; $K_T$ is the previously computed gain of the transistor stage. The theoretical thermal noise voltage of the transistor unit being tested, for a white noise bandwidth of 15 kc., can then be computed as:

$$1.6 \times 10^{-8} \frac{R_{g.eq.} T}{300}$$

where $$R_{g.eq.} = \frac{R_{35} \times R_{in}}{R_{35} + R_{in}} \qquad R_{in} = h_i - \frac{h_f h_r}{h_o + \frac{1}{R_{16}}}$$

T is ambient temperature in Kelvin units; $R_{16}$ is the resistance of resistor 16; and $R_{35}$ is the resistance of resistor 35. From these calculations the noise figure of the transistor may be determined as the decibel level of the equivalent noise voltage above the theoretical thermal noise voltage.

Figure 4:
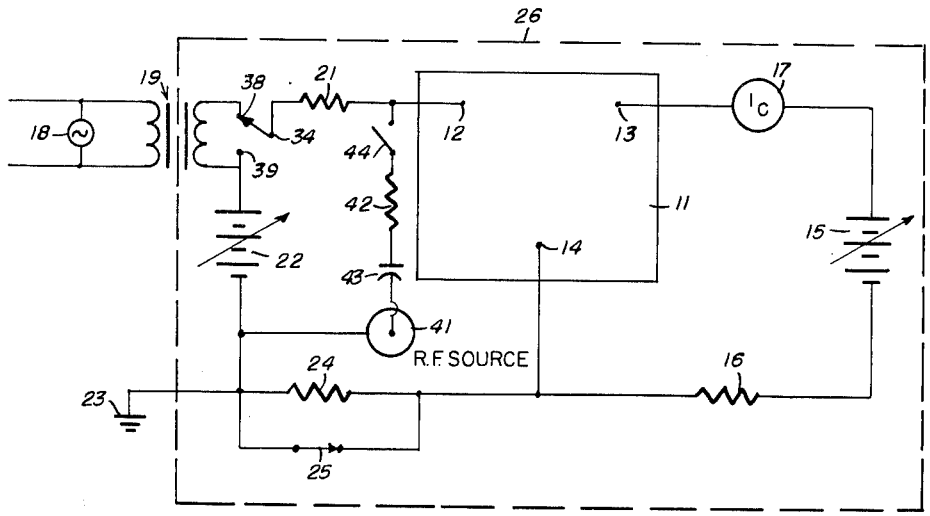
FIGURE 4 is a schematic drawing of the apparatus utilized for radio frequency measurements.

In order to determine radio frequency cut-off parameters of the transistor unit being tested, the apparatus disclosed in FIGURE 4 may be utilized. In determining the R.F. characteristics alpha and beta cut-off frequencies, a circuit arrangement quite similar to that employed in FIGURE 3 or FIGURE 1 is utilized wherein the A.C. supply voltage 18 is coupled to input terminal 12 by way of transformer 19, switch 34 and contacts 38 and 39. The latter contacts are connected to either side of the secondary winding of transformer 19. Resistor 24 is maintained short circuited by switch 25 under all circumstances except when the voltage across it is being measured. A variable frequency R.F. signal source 41 is connected between ground terminal 23 and input terminal 12 by way of decoupling resistor 42 which is series connected to capacitor 43 designed to prevent D.C. bypass of bias supply 22. The R.F. signal source 41, capacitor 43 and resistor 42 are connected to input terminals 12 when switch 44 connected in series therewith is closed.

With switch 34 alighting on contact 38 and switch 44 open so that R.F. signal source 41 is disconnected from input terminal 12, the audio frequency current gain of the unit being tested is determined by measuring the voltage across resistor 16 with resistor 24 short circuited and by measuring the voltage across resistor 24 with switch 25 open. Switch 34 is then adjusted so that it alights on contact 39 and removes audio signal source 18 from the circuit and switch 44 is closed thereby connecting the R.F. signal source into the circuit. Switch 25 is opened and the amplitude of R.F. signal source 41 is adjusted until the A.C. voltage across resistor 24 equals the A.C. voltage across that component when source 18 was connected in the circuit. The frequency of the R.F. signal source is then adjusted until the A.C. voltage across resistor 16 is equal to 70.7% of the voltage that was across resistor 16 when the audio source was coupled to input terminals 12 thereby indicating the cut-off frequency of the unit being tested. To measure the beta cut-off frequency the transistor is connected in a common emitter configuration and to measure the alpha cut-off frequency it is connected in a common base configuration. The change from one type of circuit arrangement to the other is easily accomplished as will be seen when considering FIGURE 5.

Figure 5:
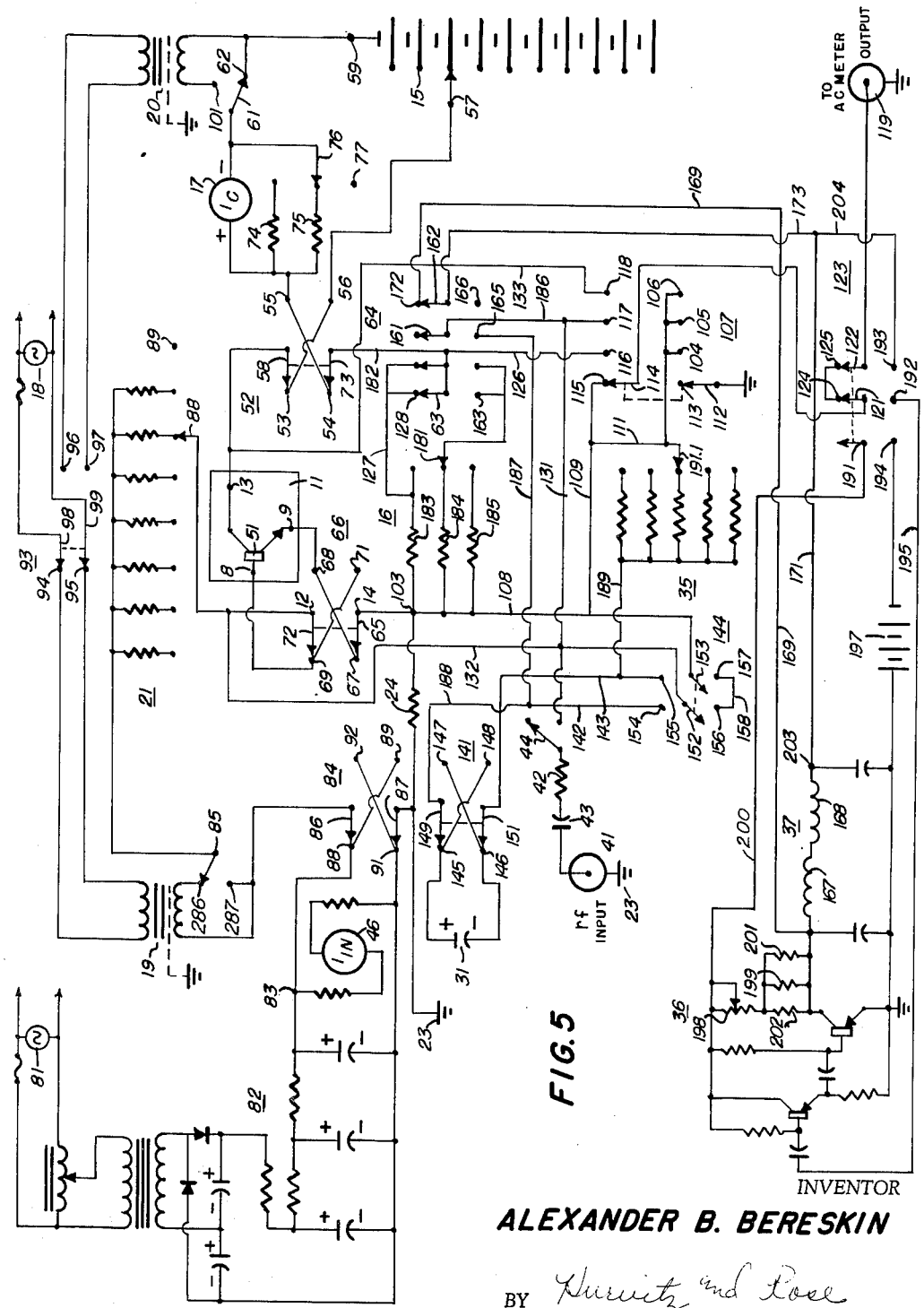
FIGURE 5 is a complete schematic illustration of a preferred form of this invention.

FIGURE 5 of the drawings is a schematic diagram of the entire apparatus assembled according to the preferred embodiment of this invention. The transistor 51, being tested is inserted into the test block 11 so that the base electrode is connected to terminal 8, the emitter electrode connected to terminal 9 and the collector electrode connected to terminal 13. These connections remain fixed throughout the transistor test cycle, regardless of whether measurements are desired in the common emitter or common base circuit configurations. Since the particular transistor illustrated is of the NPN variety, double pole, double throw reversing switch 52 is connected to contacts 53 and 54 rather than to contacts 55 and 56 as it would be connected for the PNP type transistor. Positive D.C. collector bias is supplied to terminal 13 by way of variable D.C. source 15 having a tap 57 connected to contacts 56 and 53 and the armature 58 of switch 52; the armature being connected directly to the output terminal 13. The negative terminal 59 of battery 15 is connected to load resistor 16 comprising resistors 183, 184 and 185 and switches 63 and 181 by way of switch 61. The armature of switch 61 normally engages contact 62, thus by-passing any voltage that might be induced in the secondary winding of transformer 20. The armature of switch 61 is connected by way of D.C. milliammeter 17 to contacts 55 and 54 of double pole, double throw switch 52; contact 54 being connected to load resistor 16 by way of armature 63 of switch 64. The other side of resistor 16 is connected to armature 65 of double pole, double throw reversing switch 66 having contacts 67 and 68 connected together and contacts 69 and 71 connected together.

In the circuit configuration illustrated, transistor 51 is connected in a common emitter circuit and load resistor 16 is connected to terminal 14 which is connected to terminal 9 and the emitter electrode by way of armature 65, and contacts 67 and 68. In this manner, D.C. bias circuit for collector 13 is established between tap 57 and terminal 59 and between terminals 13 and 14. If the transistor 51 is connected in a common base circuit rather than a common emitter circuit, double pole, double throw switch 66 is reversed so that armatures 65 and 72 alight on contacts 71 and 68, respectively, and collector bias is established between terminal 13 and terminal 8. In a similar matter, if a PNP rather than a NPN type transistor is being tested, the armatures 58 and 73 of switch 52 are reversed so that they alight on terminals 55 and 56, respectively. By utilizing this simple arrangement the voltage on terminal 13 is easily reversed for the different types of transistors that may be tested.

In order to accurately determine the D.C. current flowing through the collector electrode connected to terminal 13, milliammeter 17 is shunted by resistors 74 and 75 to which tap 76 may be connected. Switch 76 may also alight on unconnected contact 77 if a very small D.C. collector current is being supplied to the transistor under test. Of course it is to be understood the meter 17 may be appropriately calibrated for the three different conditions which switch 76 may be set.

Bias voltage, equivalent to variable battery 22 of FIGURES 1–4, for input terminal 12 is obtained from A.C. supply 81 and a conventional transformer-rectifier circuit 82 that provides a D.C. voltage, variable between 0 and 300 volts in the preferred form, between terminal 83 and the ground or common terminal 23. The D.C. voltage at terminal 83 is supplied to input terminal 12 by double pole, double throw reversing switch 84, toggle switch 85 and variable, current limiting resistor network 21.

Reversing switch 84 comprises ganged armatures 86 and 87 as well as contacts 88 and 89 which are connected together and contacts 91 and 92 which are connected together. In the illustrated embodiment, armatures 86 and 87 are connected so as to provide a positive D.C. voltage to terminal 12 since transistor 51 is of the NPN type. However, if the transistor is of the opposite type, i.e. PNP, armatures 86 and 87 are transferred so that they alight on contacts 92 and 89, respectively, and supply a negative voltage with respect to ground to input terminal 12.

Toggle switch 85 is employed to permit the voltage induced in the secondary winding of transformer 19 to be selectively applied in series with the biasing voltage supplied to terminal 12. With the toggle switch in the position shown, alighting on contact 286, the voltage induced in the secondary winding of transformer 19 will be supplied to input terminal 12, but when the switch armature position is varied so that it alights on terminal 287, directly connected to armature 86, the A.C. voltage induced in the secondary winding of transformer 19 is bypassed and will not be supplied to the input terminal 12.

Variable current limiting resistor 21 comprises a plurality of separate highly accurate resistors which connect switch 85 to reversing switch 66 by way of tap 88. The tap 88 may alight on any of the contacts associated with the various resistors or it may alight on contact 89 to provide an open circuit to input terminal 12. Contact 88 is connected to input terminal 12 by way of armature 72 of reversing switch 66 so as to enable proper biasing to be applied to transistor 51 regardless of its circuit configuration. The values of the resistors associated with variable, current limiting resistor 21 are such as to limit the D.C. input current to terminal 12 from 0 micro-amps to 10 milli-amps in the preferred embodiment of the invention.

An A.C. signal may be supplied to the input or output terminals by A.C. signal source 18 connected to switch 93 having contacts 94 and 95 as well as contacts 96 and 97. When it is desired to connect signal source 18 to the input terminal 12, the ganged armatures 98 and 99 are connected to contacts 94 and 95, respectively thereby supplying an A.C. voltage to the primary winding of transformer 19. The voltage induced in the secondary winding of transformer 19 is fed to input terminal 12 by way of switch 85, variable current limiting resistor 21 and switch 66 in the manner previously described. This position of switch 93 should be utilized when making the measurements discussed in connection with FIGURES 1, 3 and 4. When it is desired to apply an A.C. signal to the output terminal 13 as required for measuring $h_o$, $h_r$ and $g_o$, the measurements discussed in conjunction with FIGURE 2, supra, armatures 98 and 99 of switch 93 are connected to contacts 96 and 97 to supply an A.C. voltage to the secondary winding of transformer 20. With switch 61 alighting on terminal 101, an A.C. voltage of small magnitude is fed in series with the D.C. biasing supply to output terminal 13.

Resistor 24, connected between ground terminal 23 and resistor 16, serves to measure the current flow through terminals 12 and 14 in determining the values of $h_i$ and $h_f$ as well as the R.F. measurements of FIGURE 4. The junction 103 between resistors 24 and 16 is connected to contacts 104, 105 and 106 associated with switch 107 by means of leads 108, 109 and 111. Resistor 24 is short circuited for all conditions of switch 107 except when armature 112 thereof alights on open circuited contacts 113. When the armature alights on the other three contacts, 104, 105 and 106, resistor 24 is short circuited because both ends thereof are connected directly to ground since armature 112 which is directly connected to ground is connected to terminal 103.

To determine the voltages across resistors 16 and 24 as well as the voltages between terminals 12 and 14 and terminals 13 and 14, armature 114 of switch 107 is connected to contacts 115, 116, 117 and 118. Armatures 114 and 112 of switch 107 are ganged together so that resistor 24 is short circuited except when the voltage across it is being measured. Armature 114 is connected to output terminal 119 by way of the armatures 121 and 122 of switch 123. The other side of output terminal 119 is grounded thereby providing potentials between terminal 119 and ground indicative of the voltages being supplied to armature 114 since contacts 124 and 125 normally engaged by armatures 121 and 122, respectively, are connected together.

With armature 114 alighting on contact 115, as shown on the drawing, the voltage across resistor 24 is supplied to output terminal 119 since its other side is grounded. When switch 107 is moved to its second position and ganged armatures 112 and 114 alight on contacts 104 and 116, respectively, resistor 24 is short circuited and the voltage between resistor 16 and ground is coupled to output terminal 119 by way of lead 126 connected to the armature 63 of switch 64 and lead 127 connected between one side of resistor 16 and contact 128 of switch 64. To measure the voltage, $V_3$, between the input terminal 12 and terminal 14, armatures 112 and 114 of switch 107 are moved to their third position so that they alight on contacts 105 and 117, respectively. Since terminal 14 is now grounded because of its connection to terminal 103, resistor 24 being short circuited, the voltage at input terminal 12 is supplied to output terminal 119 by way of contact 117, leads 131 and 132 connected to the contacts 12 and 69 and the armatures 72 of switch 66. With switch 107 moved to its fourth position so that armatures 112 and 114 respectively engage contacts 106 and 118, the voltage, $V_4$, between terminals 13 and 14 is coupled to output terminal 119 by way of lead 133 connected between terminal 13 and contact 118.

To provide an A.C. short circuit between terminals 12 and 14, such as described in conjunction with FIGURE 2 supra, capacitor 31 is connected across terminals 12 and 14 by closing switch 144. The circuit is completed by leads 142 and 143 connected to the contacts of switch 144 and the armatures of switch 141 and leads 108 and 132 connected to the armature of switch 144. As previously described, leads 108 and 132 are connected by way of reversing switch 66 to terminals 12 and 14.

Reversing switch 141 comprises contacts 145 and 146 connected across opposite sides of capacitor 31 and respectively connected to contacts 147 and 148. In utilizing capacitor 31 to provide an A.C. short circuit between terminals 12 and 14 for either a NPN type transistor connected in a common emitter circuit or a PNP type transistor connected in a common base circuit, armatures 149 and 151 respectively alight on contacts 145 and 146. For testing a NPN type transistor connected in a common base circuit or a PNP type transistor connected in a common emitter circuit the positions of armatures 149 and 151 are reversed so that they respectively alight on contacts 147 and 148. In this manner the D.C. potential across capacitor 31 will always be maintained in the proper polarity regardless of the transistor being tested and its circuit configuration.

Normally open double pole, double throw switch 144 is employed to apply either an A.C. or a D.C. short circuit between terminals 12 and 14. With ganged armatures 152 and 153 alighting on contacts 154 and 155, respectively, an A.C. short circuit is provided between terminals 12 and 14 since the A.C. impedance of capacitor 31 is sufficiently small for the frequency of the A.C. input signal supplied by source 18. When it is desired to short circuit terminals 12 and 14 directly together for all voltages, particularly D.C., switch 144 is positioned so that armatures 152 and 153 alight on contacts 156 and 157 which are short circuited together by lead 158. Of course it is to be understood that if neither an A.C. nor a D.C. short circuit between terminals 12 and 14 is required for the measurement being conducted, armatures 152 and 153 of switch 144 are removed from all of the contacts 154, 155, 156 and 157.

In making the $h_i$ and $h_f$ measurements described above in conjunction with FIGURE 1, A.C. supply 18 is connected between terminals 12 and 14 by placing the armatures 98 and 99 on contacts 94 and 95, respectively. The armature of switch 85 is moved so that it engages contact 86 and an A.C. input signal is supplied to terminal 12. Switches 52, 66, 84 and 141 are placed in their proper positions and the D.C. bias applied to the transistor being tested is adjusted by movement of taps 57 and 88 and adjustment of the variable transformer connected to A.C. supply 81. A suitable A.C. voltmeter is connected between terminal 119 and ground and voltage measurements across resistors 16 and 24, and between terminals 12 and 14 are effected by engaging armature 114 with contacts 115, 116 and 117.

In the making of the $h_o$, $h_r$ and $g_o$ measurements referred to above in conjunction with FIGURE 2, switch 93 is adjusted so that armatures 98 and 99 thereof engage contacts 96 and 97, respectively, and a small amplitude A.C. signal is supplied to the secondary winding of transformer 20. Armature 61, connected to the secondary winding of transformer 20, is adjusted so that it engages contact 101 thereby feeding a small amplitude A.C. signal to the collector of the transistor under test. The bias supplied to terminals 12 and 13 is again adjusted by moving armatures 88 and 57 into contact with the proper taps on battery 15 and resistor element 21, respectively, and adjustment of the variable transformer connected to A.C. supply 81, until the proper values are read on D.C. meters 17 and 46. D.C. milliammeter meter 46 is connected between terminals 83 and 91 and a pair of large magnitude resistors is connected in series therewith. Although meter 46 is connected as a voltmeter it serves to measure the D.C. current supplied to terminal 12 since its load consists essentially of resistor 21 comprising a plurality of standardized resistances of large magnitude. Meter 46 may be calibrated in terms of the resistors which comprise resistance bank 21 to ascertain the D.C. input current easily. In order to make A.C. open circuit input measurements, switch 144 is positioned so that armatures 152 and 153 fail to engage any of the contacts associated therewith and the voltages across resistor 16 and between terminals 12 and 14 and terminals 13 and 14 are measured by engaging armature 114 of switch 107 with contacts 116, 117 and 118 thus coupling A.C. voltages to the A.C. voltmeter connected between terminal 119 and ground. To measure output conductance with an A.C. short circuit between input terminals 12 and 14, armatures 152 and 153 engage contacts 154 and 155, respectively, so as to connect capacitor 31 between terminals 12 and 14. Armature 114 now engages contacts 116 and 118 and the separate voltages existing at these terminals are read from the A.C. meter connected to terminal 119. From these measurements, the quantities $h_o$, $h_r$ and $g_o$ may be determined in the manner previously described in connection with FIGURE 2.

To measure D.C. current gain and D.C. operating conditions it is merely necessary to properly adjust the biases applied to the input and collector terminals by adjusting the position of taps 57 and 88, and adjustment of the variable transformer connected to A.C. supply 81, and to disconnect any A.C. signal voltages which would normally be applied to either the input or output terminals. This is accomplished by connecting the armature of switch 85 to contact 87 and the armature 61 to contact 62. To measure collector current with the input terminals short circuited together, armatures 152 and 153 of switch 144 are short circuited together by engaging contacts 156 and 157 and the resulting collector current is read on milliammeter 17. When testing for collector current with an open circuit across the transistor input terminals, tap 88 is moved so that it engages terminal 89 and armatures 152 and 153 are removed from all contacts of the switch 144. The resulting collector current is read by observing the deflection of the movement associated with milliammeter 17. D.C. input current is determined by observing the deflection of the movement associated with meter 46. To determine the D.C. current gain, $h_F$, tap 88 engages one of the resistors of resistance bank 21 for the desired value of collector current. Switches 85 and 61 are adjusted so that no A.C. signal is supplied to either the input or output terminals of test block 11. Fine adjustment of the input current is effected by adjustment of the variable transformer connected to A.C. supply 81. The resultant input current is observed on meter 46 and $h_f$ is calculated as the ratio of collector to input current.

In order to obtain the noise test measurements described above in conjunction with FIGURE 3, ganged armatures 63, 161 and 162 of switch 64 are adjusted so that they respectively engage contacts 163, 165 and 166. Under all measurements except the noise test measurements, armature 63 serves to connect resistor 16 to terminal 116 in the manner previously described; armature 161 is open circuited since the contact it engages is unconnected and armature 162 provides a short circuit for low pass filter 37 since it connects inductors 167 and 168 thereof together by way of leads 169 and 171. Lead 169 is connected to contact 172 which armaturme 162 normally engages, while lead 171 is directly connected to armature 162 by way of lead 173.

When a noise test is being conducted collector load resistor 16 is made variable by connecting tap 181 into the circuit by way of contact 163, armature 63 and the lead 182 extending between armature 63 and armature 73 of switch 52. As previously described, armature 73 is connected to either the positive or negative terminals 59 or 57 of collector bias supply 15. By connecting tap 181 into the circuit, collector load resistor 16 is made variable since it now comprises three standardized resistors 183, 184 and 185 which tap 181 may engage. These standardized resistors are preferably designed to be equal to 100.0, 1000 and 10,000, ohms, respectively, in order to facilitate calculations in which voltages obtained thereacross are involved. By engaging armature 161 with contact 165, a series circuit comprising variable resistor bank 35 and capacitor 31 is established between input terminals 12 and 14 by way of lead 186 connected to armature 161. The circuit connection is effected by lead 131 connected to leads 186 and 132, which in turn is connected to terminal 12 and by the connection between contact 165 and leads 187 and 188 which eventually are connected to the capacitor 131. The other side of the capacitor is connected to reversing switch 141, leads 143 and 189 and to one terminal of variable resistor 35. The other terminal of resistor 35 is connected to terminal 14 by way of leads 111, 109 and 108 by way of variable tap 191.1. For all of the measurements employed with the noise figure valuations, armature 112 engages either contact 104, 105 or 106 so that contact 191.1 of variable resistor 35 and terminal 14 are grounded at the necessary times.

In determining the audio frequency gain of the transistor being tested, tap 181 of collector load resistor 16 is moved so that it engages a selected one of resistors 183, 184 or 185. Tap 191.1 engages the appropriate resistor of the bank which makes up resistor 35. The low frequency gain is determined by applying an input signal to terminal 12 in the manner previously described and by measuring the A.C. voltages between terminals 12 and 14 and across collector load resistor 16 with an A.C. meter connected to terminal 119. The armature of switch 85 is then moved so that it engages contact 87 and no input signal is applied to terminal 12. The ganged armatures 124, 125 and 191 of switch 123 are moved so that they respectively engage contacts 192, 193 and 194. With switch 123 in this position, the voltage on armature 114 is coupled to the input terminal of a conventional two stage transistor amplifier by way of armature 121, contact 192 and lead 195. Armature 191, formerly in an open circuit position, now engages contact 194 and supplies collector bias to the transistor amplifying elements of amplifier 36 by connecting battery 197 to the transistor collectors by way of lead 200.

Transistor amplifier 36 is generally of conventional design employing an input stage and a second resistance capacitance coupled stage. Rheostat 198 serves to accurately fix the gain of the amplifier to a suitable value, such as 100. This value permits ease of future computation. Thermistors 199 and 201 are connected in parallel with the collector load resistor 202 of the second stage so as to provide constant amplification with temperature variations of the transistor elements. The output signal obtained from the second transistor stage of amplifier 36 is fed to low pass filter 37, of conventional design and preferably having a 15.5 kilocycle band width. The short circuit previously existing across inductors 167 and 168 of the low pass filter 37 is removed because armature 162 now engages contact 166. The output terminal 203 of low pass filter 37 is coupled to output terminal 119 by way of leads 171 and 204 connected to contact 193 and armature 122 of switch 123. When making the equivalent noise measurement at the input terminals of the transistor wherein the armatures of switch 123 engage contacts 192, 193 and 194, it is to be remembered that an R.M.S. voltmeter, preferably of the vacuum tube type, is to be connected between output terminal 119 and ground. Calculations for obtaining the equivalent noise voltage at the input terminals and the theoretical thermal noise voltage generated by the transistor being tested are set forth above in connection with the description of FIGURE 3.

It is to be realized that for increased sensitivity amplifier 36 may be connected to armature 114 for other measurements besides the noise test measurements. This is desirable in increasing the sensitivity of the entire unit and for obtaining accurate measurements of very low voltages that may be coupled to armature 114.

In order to effect the radio frequency measurements described above in connection with FIGURE 4, it is necessary to return the armatures of switch 64 to their initial position so that contacts 128 and 172 are again connected in the circuit. The voltages across resistors 16 and 24 are measured with a conventional A.C. meter with a signal source 18 applied to input terminal 12. The armature of switch 85 is moved so that it engages contact 287 and the audio frequency supply connected to terminal 12 is removed therefrom and switch 44 is closed, thus connecting current limiting resistor 42 and blocking capacitor 43 as well as variable frequency R.F. signal source 41 between ground terminal 23 and input terminal 12. The amplitude of the R.F. signal source is adjusted so that the R.F. voltage across resistor 24 is equal to the audio frequency voltage existing thereacross when A.C. supply 18 is connected to input terminal 12. The measurements across resistor 24 are accomplished in the usual manner, previously described. The frequency of the R.F. source is now varied maintaining the voltage across resistor 24 constant until the R.F. voltage across resistor 16 is equal to 70.7% of the voltage across resistor 16 when the audio frequency signal was applied to input terminal 12. These measurements may be made for both the common base and the common emitter configurations of the transistor being tested in order to accurately determine both alpha and beta cut-off frequencies.

It should now be apparent that there has been herein disclosed apparatus for measuring a plurality of transistor parameters for A.C. and D.C. operating conditions, for measuring noise characteristics of a transistor and for determining alpha and beta cut-off frequencies of a transistor under test. By employing suitable calculations the conductance and impedance parameters as well as the hybrid parameters may be calculated from the small A.C. signal parameters determined by the measuring apparatus. This measuring system may be utilized with both NPN and PNP type transistors when they are connected in either common base or common emitter circuit configurations.

While I have described and illustrated one specific embodiment of my invention, it will be clear that variations of the details of construction which are specifically illustrated and described may be resorted to without departing from the true spirit and scope of the invention as defined in the appended claims.

I claim:

1. Apparatus for enabling the $h_i$, $h_f$, $h_o$ and $h_r$ characteristics of a tested transistor to be derived, said transistor having emitter, base and collector electrodes, comprising a first resistor connected between a first terminal and said collector electrode, a first source of D.C. electrode biasing voltage connected to said collector electrode for energization thereof, a second resistor connected between a common terminal and a second terminal, a second source of D.C. electrode biasing voltage connected to said second terminal, means for selectively connecting the transistor emitter or base electrode to said first terminal while connecting the other one of said base or emitter electrodes of said transistor to said second terminal, a source of A.C. voltage, means for connecting said A.C. voltage source selectively in series circuit with said first or second resistor, said A.C. voltage source when connected in series with said first resistor being connected between said first terminal and said collector electrode, and when connected in series with said second resistor being connected between said common terminal and said second terminal, a third resistor connected between said first and common terminals, means for selectively short-circuiting said third resistor, and switch means selectively connected: across each of said resistors, to said terminals, and to said collector electrode; for enabling derivation of signals having amplitudes proportional to the voltages: across the respective resistors, between said first and second terminals with said third resistor short-circuited, and between said collector electrode and said first terminal with said third resistor short-circuited.

2. The apparatus of claim 1 further comprising means for measuring the direct current flowing through said collector electrode and for effectively measuring the direct current flowing through said second terminal.

3. The apparatus of claim 1 including means for selectively short-circuiting said second and common terminals for the A.C. signal source only.

4. The apparatus of claim 1 including means for measuring noise generated by said transistor, said noise measuring means comprising a series circuit including a further resistor and a capacitor, another switch means for selectively connecting said series circuit between said second and common terminals, a low noise amplifier having input and output terminals, means for selectively connecting said input terminals across said first resistor, and a low pass filter connected across said amplifier output terminals.

5. The apparatus of claim 4 further including means for selectively effectively removing said low pass filter from the output terminals of said amplifier.

6. The apparatus of claim 1 further including means for selectively applying a variable frequency, R.F. signal source between said second and common terminals.

7. The apparatus of claim 1 further comprising means for selectively short-circuiting said first and second terminals together.

8. The apparatus of claim 1 further including additional means for reversing the polarity of the D.C. bias voltages applied to said first and second terminals and said collector electrode.

9. The apparatus of claim 1 wherein said first and second resistors are variable.

10. The apparatus of claim 1 wherein said A.C. signal source comprises a 60 cycle power line, said power line being connected to said terminals and said collector electrode by a transformer and a coaxial shielded cable having its outer conductor grounded.

11. Apparatus for enabling the $h_i$, $h_f$, $h_o$ and $h_r$ characteristics of a tested transistor to be derived, said transistor having emitter, base, and collector electrodes, comprising a first source of D.C. electrode biasing voltage and a first resistor connected in a first series circuit between a first terminal and said collector electrode, a second source of D.C. electrode biasing voltage and a second resistor connected in a second series circuit between a common terminal and a second terminal, means for selectively connecting the transistor emitter or base electrode to said first terminal while connecting the other one of said base or emitter electrodes of said transistor to said second terminal, a source of A.C. voltage, means for connecting said A.C. voltage source selectively in said series circuit with said first or second resistor, a third resistor connected between said first and common terminals, means for selectively short-circuiting said third resistor, and switch means selectively connected: across each of said resistors, to said terminals, and to said collector electrode; for enabling the derivation of signals having amplitudes proportional to the voltages: across the respective resistors, between said first and second terminals with said third resistor short-circuited, and between said collector electrode and said first terminal with said third resistor short-circuited.

12. Apparatus for enabling the $h_i$, $h_f$, $h_o$ and $h_r$ characteristics of a tested transistor to be derived, said transistor having emitter, base and collector electrodes, comprising a first source of D.C. electrode biasing voltage connected to said collector electrode for energization thereof, a first resistor connected between a first terminal and said collector electrode, a second source of D.C. electrode biasing voltage connected for energizing a second terminal, a second resistor connected between said common terminal and said second terminal, means for selectively connecting the transistor emitter or base electrode to said first terminal while connecting the other one of said base or emitter electrodes of said transistor to said second terminal, a source of A.C. voltage, means for connecting said A.C. voltage source selectively in series circuit with said first resistor between said first terminal and said collector electrode or in series with said second resistor between said common terminal and said second terminal, a third resistor connected between said first and common terminals, switch means selectively connected: across each of said resistors, to said terminals, and to said collector electrode; for enabling the derivation of signals having amplitudes proportional to the voltages: across the respective resistors, between said first and second terminals, and between said collector electrode and said first terminal; and means for short-circuiting said third resistor except when the voltage across it is being derived.

References Cited by the Examiner

UNITED STATES PATENTS

| | | | |
|---|---|---|---|
| 2,799,827 | 7/57 | Geppert et al. | 324—158 |
| 2,850,699 | 9/58 | Davidson et al. | 324—158 |
| 2,856,585 | 10/58 | Gibbons | 324—158 |
| 2,907,954 | 10/59 | Radcliffe | 324—158 |
| 3,051,900 | 8/62 | Zechter et al. | 324—158 |

OTHER REFERENCES

"I.R.E. Standards on Methods of Testing Transistors," Proceedings of the I.R.E., November 1956, pages 1543–1561.

"Measurement of Junction-Transistor Noise in the Frequency Range 7–50 KC/S" (Stephenson), Proceedings of the Institute of Electrical Engineering, November 1955, part B, No. 6, pages 753–756.

WALTER L. CARLSON, *Primary Examiner.*

SAMUEL BERNSTEIN, *Examiner.*